March 14, 1939.  S. F. ANDERSON  2,150,479
DISPENSING APPARATUS
Filed Aug. 27, 1937　　2 Sheets-Sheet 1
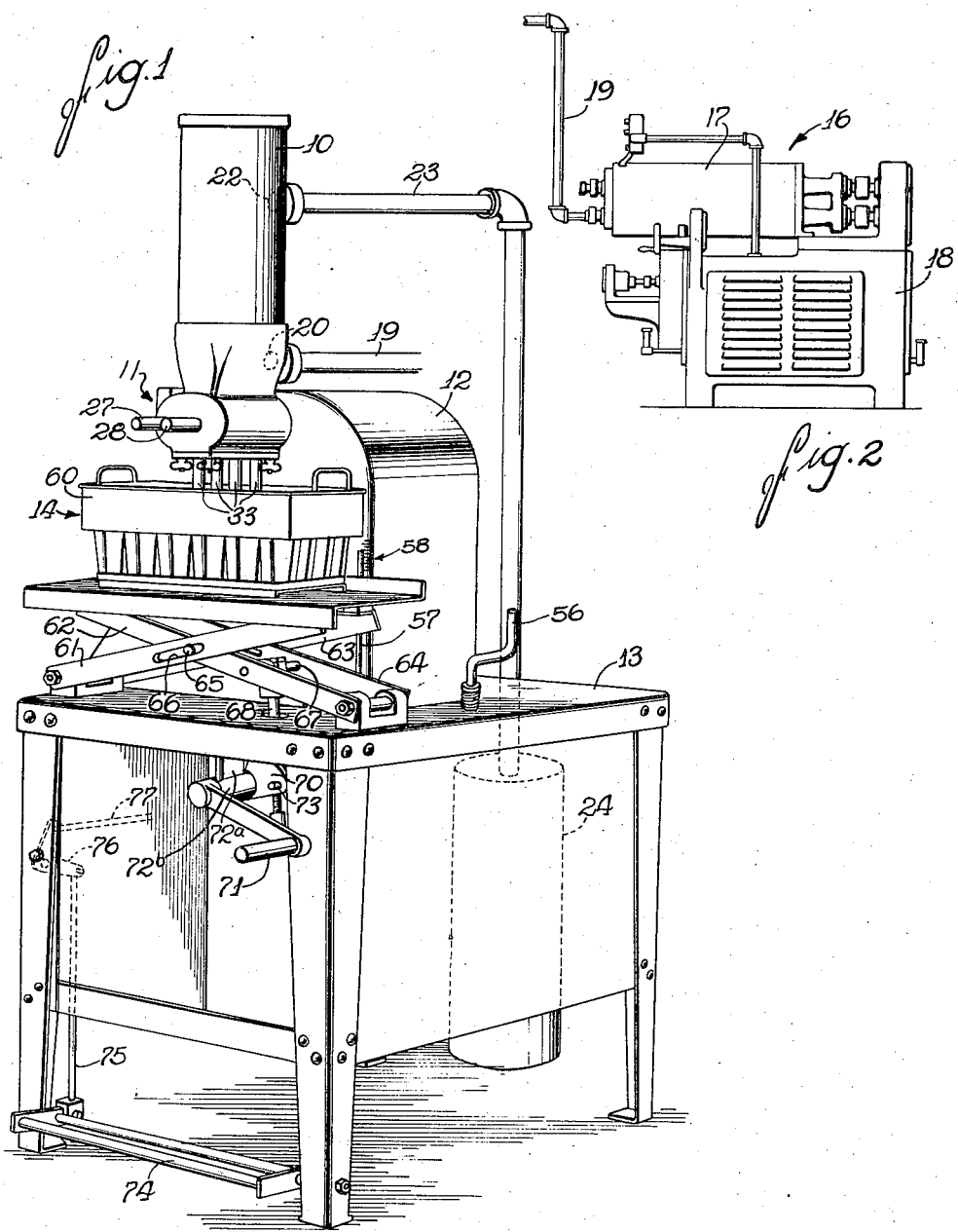
INVENTOR
Swan F. Anderson
By Parker, Carlson, Pitzner & Hubbard
ATTORNEYS March 14, 1939.  S. F. ANDERSON  2,150,479
DISPENSING APPARATUS
Filed Aug. 27, 1937   2 Sheets-Sheet 2
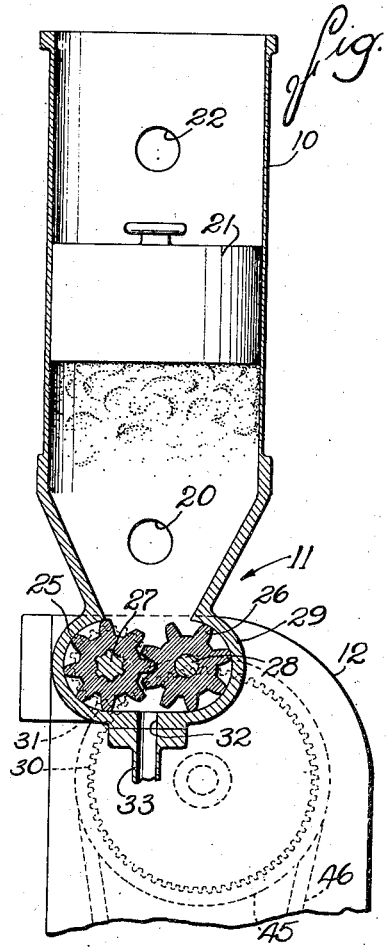
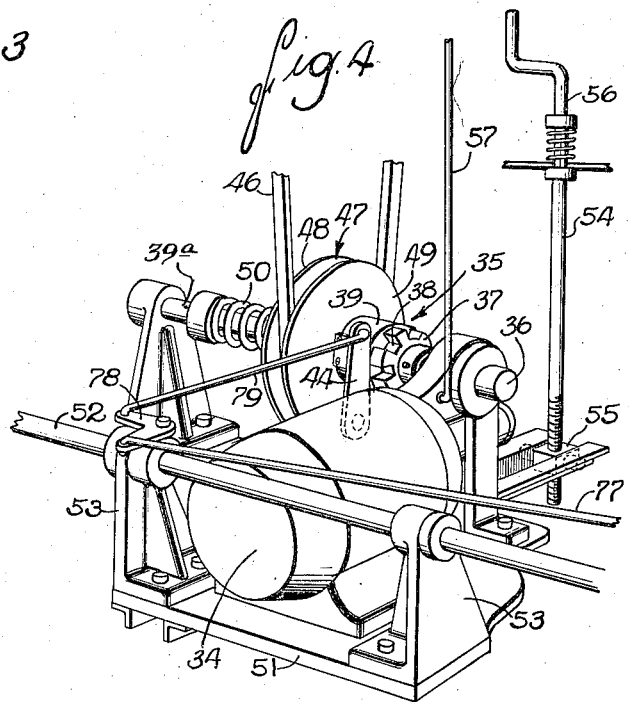
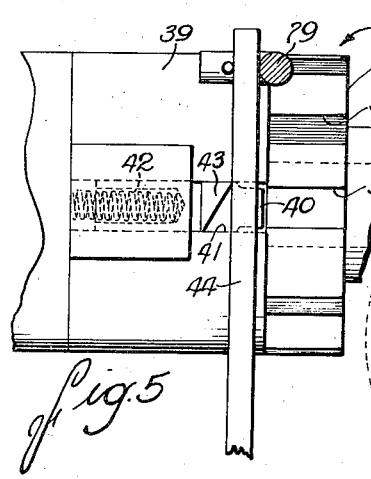
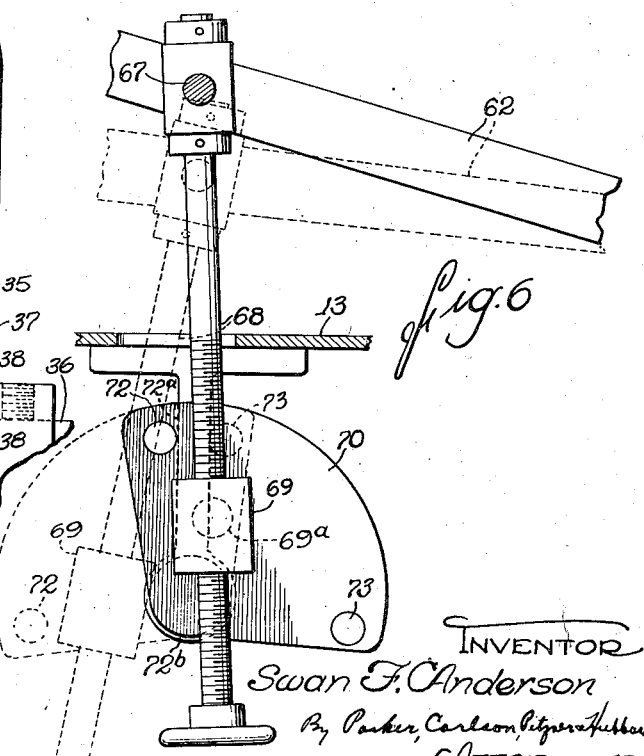
INVENTOR
Swan F. Anderson
By Parker, Carlson, Pitzner & Hubbard
ATTORNEYS Patented Mar. 14, 1939

2,150,479

UNITED STATES PATENT OFFICE 2,150,479

DISPENSING APPARATUS

Swan F. Anderson, Rockford, Ill.

Application August 27, 1937, Serial No. 161,205

5 Claims. (Cl. 226—107)

The invention relates to dispensing apparatus and more particularly to apparatus for filling suitable containers or molds with measured quantities of such semi-liquid materials as partially frozen ice cream.

The general object of the present invention is to provide an apparatus of the type set forth which may be effectively and efficiently manipulated by a single operator to fill a large number of containers and which may be readily regulated to vary the quantity of material dispensed in order to fill accurately containers of a large variety of different sizes.

A more specific object of the invention is to provide a cyclically operating dispensing apparatus of the type set forth adapted to discharge a measured quantity of material during each cycle of operation, the control for the apparatus being of such character that the number of consecutive cycles as well as the quantity of material discharged in each cycle may both be independently varied.

The invention also resides in certain structural improvements in the apparatus by means of which the operator is enabled to control the apparatus effectively and efficiently.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings in which Figure 1 is a general perspective view of a dispensing apparatus embodying the invention.

Fig. 2 is a side elevation of an ice cream freezer adapted to supply material to the dispensing apparatus of Fig. 1.

Fig. 3 is an enlarged vertical sectional view of the hopper and associated discharge and measuring mechanism for the apparatus shown in Fig. 1.

Fig. 4 is an enlarged detail perspective view of the power actuating mechanism and a portion of the controls therefor included in the apparatus of Fig. 1.

Fig. 5 is an enlarged detail view of the start-stop clutch mechanism included in the apparatus of Fig. 4.

Fig. 6 is an enlarged detail view of a portion of the linkage mechanism utilized for moving successive containers into filling position in the dispensing apparatus.

For purposes of illustration of its various novel features, the invention has been shown and described herein as embodied in a machine for filling ice cream molds, cups, or other containers with partially frozen ice cream. It will be understood by those skilled in the art, however, that apparatus embodying the invention may also be utilized for dispensing other such semi-liquid products.

Generally stated, the apparatus comprises a material receiver shown as a hopper 10 (Fig. 1) provided with a measuring and dispensing mechanism designated generally by the numeral 11. This mechanism is secured to the front of a vertical metal housing 12 mounted on the top of a generally rectangular table or framework 13. Containers, such as a plural cavity mold 14, are placed on a horizontal platform 15 and elevated thereby into filling position with respect to the discharge mechanism 11.

Partially frozen ice cream may be supplied to the dispensing apparatus from any suitable source as, for example, from a power actuated ice cream freezer 16 shown in Fig. 2. This freezer is of conventional design and embodies a mixing and freezing tank 17 having power operated stirrers therein. The components of the ice cream mixture introduced into the freezer tank are thoroughly mixed and are cooled by a suitable cooling medium circulated in heat exchange relation therewith from a refrigerating apparatus located in the enclosed base 18. The partially frozen ice cream is discharged continuously and under pressure from the freezer into a conduit 19 which conveys the material to an inlet 20 of the hopper 10.

A reserve supply of semi-liquid ice cream is maintained in the hopper 10 being withdrawn therefrom in measured quantities to fill the containers presented to the dispensing apparatus during the operation of the machine. The hopper shown is generally cylindrical in shape, being made of heat insulating material, and is of substantially uniform cross section throughout its length (Fig. 3). The ice cream enters the hopper through the inlet 20 located adjacent the bottom of the hopper and gradually fills the same, thus forcing a cylindrical piston-type plunger or weight 21 upwardly in the hopper. This piston serves to maintain the ice cream continuously under pressure despite variations in the rate of withdrawal so that the ice cream discharged into the containers or molds will have a uniform consistency. An overflow outlet 22 is located in the side wall of the hopper adjacent its upper end and is uncovered by the piston 21 at the upper extremity of its path of movement. Thus, if the rate of supply of material to the hopper exceeds the rate of withdrawal, the excess is permitted to escape through the outlet 22 and is conveyed therefrom through a conduit 23 to a suitable overflow receptacle 24 (Fig. 1).

Measured quantities of ice cream may be intermittently withdrawn from the hopper by the measuring and discharge mechanism 11. In general, this mechanism includes a movable member adapted to effect a predetermined discharge of material whose volume is a function of the extent of movement of the member. As is hereinafter described in greater detail, the movement of this member is effected by an improved actuating arrangement by means of which a fine selective control of the discharge is had so as to fill accurately containers of any desired size. The measuring and discharge mechanism includes a pair of meshing spur gears 25 and 26 (Fig. 3) carried on shafts 27 and 28 respectively which are journaled within the lower end of a casting or housing 29. The walls of the lower portion of this housing closely surround the spur gears and the upper end of the housing is flared outwardly in a general funnel-shape to receive the lower end of the hopper 10. A gear 30 disposed within the housing 12 meshes with a pinion 31 on the lower end of the shaft 27 and a suitable power actuating mechanism is connected to this gearing to rotate the spur gears 25 and 26. It will thus be seen that as the spur gear 25 is rotated in a counter-clockwise direction (as viewed in Fig. 3), the complemental spur gear 26 will be rotated in a clockwise direction and ice cream will be withdrawn from a hopper 10 and discharged through an outlet opening 32, the quantity of material thus dispensed being a function of the extent of movement of the spur gears. A suitable spout 33 is attached to the lower side of the casting 29 so as to direct the ice cream into the container which is being filled. It will be understood that any number of sets of spur gears desired may be provided on the shafts 27—28 in order to discharge ice cream simultaneously through a corresponding number of spouts and thus fill a plurality of containers.

In order to effect a cyclic actuation of the movable dispensing elements or gears 25—26, they are driven from an electric driving motor 34 (Fig. 4) through a start-stop clutch mechanism designated generally by the numeral 35. The motor 34 is connected through a suitable gearing with a shaft 36 carrying the driving member 37 of the clutch mechanism. Upon reference to Figs. 4 and 5 it will be seen that this driving member is generally cylindrical in shape and is provided with a series of axially extending peripherally disposed slots 38. A cooperating driven member 39 is carried by a shaft 39ᵃ alined with the shaft 36. Operative engagement between the driving and driven members is effected by a plunger or dog 40 mounted for axial sliding movement in a peripheral slot 41 on the driven member 39. A helical compression spring 42 serves to urge the plunger 40 outwardly so as to lodge the outer end thereof in one of the slots 38 in the driving member 37. Such outward movement of the plunger 40 may be prevented by engagement of a dog 43 on its outer surface with a two-position actuator or pivoted link 44.

When the link is momentarily pulled outward away from the dog 43 thus releasing the plunger 40, the latter moves forwardly under the bias of the spring 42 so that it engages the driving member 37 and positively connects the driving and driven members in operative relation. Upon a subsequent return of the actuator 44 to its initial position, the clutch members remain in engagement until they have substantially completed a full revolution at which time the dog 43 engages the link 44 and the plunger 40 is cammed back out of engagement with the driving member 37. As a result, the actuator link 44 may be momentarily moved from its first to its second position in order to condition the driving mechanism for operating the dispensing gears 25—26 through a cycle of movement of predetermined extent, the subsequent automatic disengagement of the clutch serving to stop the spur gears at the end of the cycle of movement. It will be apparent that if the actuator link 44 is maintained in its retracted position, the clutch will remain in engagement during any desired series of successive cycles. Thus, the quantity of material dispensed can be controlled by governing the number of cycles of operation through which the start-stop clutch mechanism is permitted to remain in engagement.

As a means of further controlling the quantity of material dispensed, an adjustable speed change mechanism is interposed between the clutch 35 and dispensing gears 25—26. Thus, in the construction shown, the driving gear 30 for the spur gears 25—26 is connected to a pulley 45 (Fig. 3) which is in turn connected by a belt 46 with a variable diameter speed change pulley 47 (Fig. 4). The speed change pulley 47 embodies the usual axially movable truncated cone sections 48 and 49, the section 49 being fast on the shaft 40 and the section 48 being axially movable thereon and urged toward the section 49 by a helical compression spring 50.

The driving motor 34 and clutch mechanism 35 as well as the speed change pulley 47 and the associated shafting are all supported on a swinging platform 51 which is journaled for pivotal movement about the horizontal axis of a shaft 52 by brackets 53. Thus, as the platform is swung downwardly, for example, the tension in the belt 46 increases so that the sections of the speed change pulley 47 are forced apart and its effective diameter decreased, the opposite change in pulley diameter being had when the platform is swung upwardly. Adjustment in the position of the swinging platform is effected by rotation of a vertical adjusting shaft 54 having its lower end threaded in a nut 55 fast on the platform. A manual operating handle 56 may be utilized to rotate this shaft. It will be seen that as changes are thus made in the speed ratio between the driven member 39 of the clutch mechanism and the dispensing gears 25—26, the extent of movement of the latter will be varied for each cycle of their operation. Consequently, a corresponding variation in the quantity of material dispensed during each cycle is also had.

To afford the operator a readily understandable indication of the setting of the speed change mechanism, a gauge is associated therewith which is calibrated in terms of quantity of material discharged. Thus, in the construction illustrated, a vertically movable gauge rod 57 (Figs. 1 and 4) is secured to the platform and moves vertically therewith. The upper end of the rod cooperates with a suitable scale 58 on the housing 12. This latter scale is calibrated, for example, in terms of pints and multiples and fractions thereof. As a consequence, the operator is able to rotate the handle 56 to adjust the speed change mechanism so that any desired quantity as, for example, one, two, or three pints of ice cream will be discharged from the different spouts during individual cycles of operation.

The container 14 has been illustrated as a plural cavity mold including a number of metal cups or cavities 59 (Fig. 1) opening into a box-like overflow chamber 60. The cups 59 are arranged in transverse rows equal in number to the number of spouts 53 and upon the filling of one row of cups, the mold is advanced to bring the next row into registry with the discharge spouts. Preferably, the spouts are disposed below the top of the cups during the filling operation in order that the ice cream will be forced out of the spouts under pressure into the cups, thus filling them without the formation of air spaces or bubbles. Consequently, it is desirable to provide for successive raising and lowering of the containers, an elevating mechanism for this purpose being provided for the platform 15.

In the improved construction illustrated, the platform is supported by two pairs of crossed links 61—62 and 63—64. The lower ends of these links are pivoted on the top of the supporting framework 13. The upper ends of the links 61 and 63 are pivoted on the lower side of the platform 15, the upper ends of the other links being slidable thereon. The pivot pin 65 in the link 62 rides in a slot 66 in the center portion of the link 61 and a similar sliding connection is had between the links 63 and 64. Raising and lowering movement is imparted to these links through an operating linkage including a shaft 67 extending between the links 62—64 and having a rod 68 pivoted thereon. This latter rod is threaded in a nut 69 (Fig. 6) pivoted at 69ª on an oscillating sector 70. Upon rotation of the sector 70 by a manually operable crank 71 (Fig. 1), the sector is turned until the rod 68 occupies the full-line position shown in Fig. 6 in which the links 61—62 and 63—64 are fully elevated. When in this position, the pivot 69ª of the nut 69 has passed its dead center position with respect to the axis of the crank and is held against further movement by the engagement of a stop 72 on the sector with a bracket 72ª which supports a bearing 72ᵇ for the shaft of the crank 71. Upon turning the crank in the opposite direction (counter-clockwise as viewed in Figs. 1 and 4), the sector 70 is shifted in the opposite direction thus moving the rod 68 to the position shown in dotted lines in Fig. 6 and thereby lowering the linkage and associated platform 15. When in this lowered position, further movement of the operating linkage is prevented by engagement of a second stop 73 with the bracket 72ª. In the event that containers of a different vertical height are to be utilized so that it is desired to change the extent of vertical movement of the platform 15, this latter result can be readily accomplished by threading the rod 68 into or out of the nut 69 and thus changing the effective length of the rod between its pivotal connections to the links 62—63 and the sector 70. It will thus be seen that a very simple and easily adjustable elevating mechanism has been provided for the containers.

In the operation of the dispensing apparatus described, one or more containers are placed on the platform 15 beneath the filling spouts 33 while the platform is in its lowered position. The operator then rotates the crank 71 to the right to elevate the platform 15 and position the lower ends of the spouts within the containers. Having thus prepared the containers for filling, a measured quantity of ice cream is dispensed by momentarily depressing a foot-operated treadle 74 (Fig. 1). This treadle is connected through a link 75, bell crank lever 76, link 77, a second bell crank lever 78, and link 79 with the clutch actuator 44. Thus, by depressing the treadle, the clutch actuator latch 44 is pulled out of engagement with the dog 43 so that the plunger 40 (Fig. 5) connects the driving and driven clutch members in operative engagement for a full revolution of the driving member 37. Upon the completion of this revolution, the dog 43 engages the latch 44 which has been permitted to return to its initial position by release of the treadle 74 and thus cams the plunger 40 back to its initial position disengaging the clutch members. As a result, the spur gears 25—26 are rotated through a predetermined extent of movement for one dispensing cycle and discharge a corresponding quantity of ice cream from the hopper into the container.

If large containers are being filled having the capacity of say three pints, the speed change mechanism may be adjusted by the crank 56 until the gauge 58 shows that the mechanism is set to discharge one pint during each cycle of operation. The operator may then hold the treadle 74 depressed while the clutch operates through three full revolutions or cycles so that the container will be accurately filled. It will be seen that, through the double control effected first by varying the number of cycles through which the clutch mechanism operates and second through varying the quantity discharged in each cycle by adjusting the speed change mechanism, a very wide range and extremely flexible control is had for the quantity of material dispensed. It will also be seen that this double adjustment control not only serves to give a wide range of variation but also facilitates rapid change-over of the control for successive containers having capacities which are multiples of each other. Thus, if the capacities of several successive containers are different but are each multiples of one pint, the speed control mechanism may be changed so that exactly a pint of ice cream will be discharged in each cycle and then the treadle 74 can be held down to operate the apparatus through the required number of cycles for each of the containers.

Although a particular embodiment of the invention has been shown and described in some detail for purposes of illustration, there is no intention to thereby limit the invention to such embodiment but, on the other hand, the appended claims are intended to cover all modifications within the spirit and scope of the invention.

I claim as my invention:

1. In a mechanism for dispensing selectively controlled quantities of semi-liquid materials such as ice cream, the combination of a supply hopper for the material having an outlet, means including intermeshing gear elements operable to dispense material contained in said hopper through said outlet in quantities determined by the extent of rotation of said gear elements, a power actuating mechanism, a cyclically operable stop-start clutch including a constantly rotating driving member and a cooperating engageable driven member operatively connected respectively to said power actuating mechanism and to said gear elements, said clutch members being automatically disengageable upon the completion of a predetermined cycle of movement of said driving member, an actuator associated with said clutch for maintaining the same engaged during any selected number of successive cycles to thereby vary the quantity of material dispensed through a movement of said gear elements of a correspondingly varied duration, and means including an adjustable speed change mechanism interposed between said clutch and said gear elements to vary the extent of the movement transmitted to said elements during each cycle of said clutch to further vary the quantity of material dispensed.

2. A mechanism for dispensing selectively variable quantities of material comprising, in combination, a receiver for a reserve supply of material having an outlet, means including a movable member for dispensing a measured quantity of material from said receiver through said outlet, the quantity of material dispensed being a function of the extent of movement of said member, power actuated means including a clutch for driving said movable member during a selected number of predetermined cycles of movement of said power actuated means, and an adjustable speed change mechanism interposed between said clutch and said movable member.

3. A mechanism for dispensing selectively varied quantities of material comprising, in combination, a dispensing device including a movable member for dispensing quantities of material which are a function of the extent of movement of said member, a rotatable power transmitting member operatively connected to said movable member, an electric driving motor mounted on a swinging platform, means including a pair of belt-connected pulleys for operatively connecting said power transmitting member and said motor, one of said pulleys being mounted on said platform and at least one of said pulleys being a variable diameter speed change pulley, a shiftable control member for adjusting the position of said platform to vary the speed ratio connection between said motor and power transmitting member, and means including a cyclically operable start-stop clutch interposed between said motor and said one pulley for operatively connecting the same during a predetermined cycle of rotation of said motor.

4. In a mechanism for dispensing measured quantities of semi-fluid ice cream or the like supplied from a continuously operating source to a succession of containers, the combination of a hopper of uniform vertical cross section adapted to contain a reserve supply of the material, a weighted vertically sliding piston in said hopper for gravitally maintaining an uninterrupted pressure on the material in the hopper, a supply conduit communicating with the lower portion of said hopper, an overflow conduit communicating with the upper portion of the hopper and arranged to be uncovered by said piston adjacent the upper extremity of its movement, an outlet in the bottom of said hopper, and means for intermittently dispensing measured quantities of material through said outlet from said hopper.

5. In a mechanism for dispensing measured quantities of semi-fluid ice cream or the like supplied from a continuously operating source to a succession of containers, the combination of a hopper of uniform cross section adapted to contain a reserve supply of the material, a piston slidably mounted in said hopper for maintaining an uninterrupted pressure on the material in the hopper, a discharge outlet in said hopper, a supply conduit communicating with the portion of said hopper adjacent said outlet, an overflow conduit communicating with a portion of the hopper remote from said outlet and arranged to be uncovered by said piston adjacent the outer extremity of its movement, and means for intermittently dispensing measured quantities of material through said outlet from said hopper.

SWAN F. ANDERSON.